(12) United States Patent
Rains et al.

(10) Patent No.: US 11,832,547 B2
(45) Date of Patent: Dec. 5, 2023

(54) PROPULSION ASSEMBLY FOR AN AGRICULTURAL IMPLEMENT

(71) Applicant: Deere & Company, Moline, IL (US)

(72) Inventors: Gerald E. Rains, Eldridge, IA (US); James R. Peterson, Annawan, IL (US); Nathan A. Mariman, Davenport, IA (US)

(73) Assignee: Deere & Company, Moline, IL (US)

( * ) Notice: Subject to any disclaimer, the term of this patent is extended or adjusted under 35 U.S.C. 154(b) by 885 days.

(21) Appl. No.: 16/526,548

(22) Filed: Jul. 30, 2019

(65) Prior Publication Data
US 2021/0029863 A1    Feb. 4, 2021

(51) Int. Cl.
| | | |
|---|---|---|
| A01B 69/04 | (2006.01) | |
| A01C 7/00 | (2006.01) | |
| B62D 11/02 | (2006.01) | |
| B62D 55/08 | (2006.01) | |

(52) U.S. Cl.
CPC .............. *A01B 69/008* (2013.01); *A01C 7/00* (2013.01); *B62D 11/02* (2013.01); *B62D 55/08* (2013.01)

(58) Field of Classification Search
CPC combination set(s) only.
See application file for complete search history.

(56) References Cited

U.S. PATENT DOCUMENTS

| | | | |
|---|---|---|---|
| 2,010,110 A | 8/1935 | Scarlett | |
| 7,597,172 B1 * | 10/2009 | Kovach | F16H 47/02 180/305 |
| 9,037,346 B2 | 5/2015 | Keys, II et al. | |
| 9,096,264 B2 | 8/2015 | Connors et al. | |
| 9,538,698 B2 | 1/2017 | McRea et al. | |
| 9,706,701 B2 | 7/2017 | Prickel et al. | |
| 9,781,873 B2 | 10/2017 | Prickel et al. | |
| 9,926,007 B2 | 3/2018 | Maniar et al. | |

(Continued)

FOREIGN PATENT DOCUMENTS

EP         3069961 A1    9/2016

OTHER PUBLICATIONS

The S-TECH 012P: Endorsed by John Deere, Soucy Track, http://www.soucy-track.com/en-ca/products/trailers/s-tech012p, publicly available at least on Oct. 15, 2018.

(Continued)

*Primary Examiner* — Maceeh Anwari
(74) *Attorney, Agent, or Firm* — Michael Best & Friedrich LLP

(57) ABSTRACT

An agricultural planter is configured to be moved over a supporting surface by a vehicle. The agricultural planter includes a frame and a planter assembly coupled to the frame. A first propulsion assembly is coupled to the frame at a first position with the first propulsion assembly having a first traction member configured to engage the supporting surface. A second propulsion assembly is coupled to the frame at a second position with the second propulsion assembly having a second traction member configured to engage the supporting surface. A drive assembly is operably coupled to at least one of the first or second propulsion assemblies and configured to drive at least one of the first or second traction members during operation of the planter assembly. The first traction member is configured to be driven independently of the second traction member.

13 Claims, 7 Drawing Sheets

(56) References Cited

U.S. PATENT DOCUMENTS

| | | | |
|---|---|---|---|
| 2004/0217575 A1 | 11/2004 | Beaujot et al. | |
| 2006/0090910 A1 | 5/2006 | Houck | |
| 2009/0166101 A1* | 7/2009 | Wenger | B62D 11/001 |
| | | | 180/6.7 |
| 2009/0273160 A1 | 11/2009 | Friggstad et al. | |
| 2015/0051795 A1* | 2/2015 | Keys, II | B62D 13/00 |
| | | | 701/41 |
| 2015/0150185 A1 | 6/2015 | Houck | |
| 2016/0039452 A1* | 2/2016 | Rotole | B62D 5/12 |
| | | | 180/414 |
| 2016/0339951 A1* | 11/2016 | Boehm | B62D 12/02 |
| 2019/0059199 A1* | 2/2019 | Stanhope | A01B 69/008 |

OTHER PUBLICATIONS

Extended European Search Report and Written Opinion issued in European Patent Application No. 20186927.8, dated Dec. 16, 2020, in 9 pages.

RockIslandHeider. Youtube video: Portland 2012 self propelled planter. Aug. 26, 2012. Available at https://www.youtube.com/watch?v=cEtUqgpBc94. (2 pages).

Farm Show Magazine. Farmer Builds Huge Self Proelled Planter. Webpage. Version Accessed Sep. 18, 2013. Available online at https://web.archive.org/web/20130918044312/https://www.farmshow.com/view_articles.php?a_id=999. (3 pages).

NewAgTalk. Forum User G706. Thread titled: Self-propelled corn planter pics. Posted Jan. 22, 2012. Available online at https://talk.newagtalk.com/forums/thread-view.asp?tid=281435&mid=2177598#M2177598 (3 pages).

* cited by examiner

PROPULSION ASSEMBLY FOR AN AGRICULTURAL IMPLEMENT

FIELD OF THE DISCLOSURE

The present disclosure relates to agricultural implements, and more particularly to agricultural implements that are moved across an agricultural field by a vehicle.

SUMMARY

In one aspect, an agricultural planter is configured to be moved over a supporting surface by a vehicle. The agricultural planter includes a frame and a planter assembly coupled to the frame. A first propulsion assembly is coupled to the frame at a first position with the first propulsion assembly having a first traction member configured to engage the supporting surface. A second propulsion assembly is coupled to the frame at a second position with the second propulsion assembly having a second traction member configured to engage the supporting surface. A drive assembly is operably coupled to at least one of the first or second propulsion assemblies and configured to drive at least one of the first or second traction members during operation of the planter assembly. The first traction member is configured to be driven independently of the second traction member.

In another aspect, the drive assembly is operably coupled to both the first and second propulsion assemblies and configured to drive the first traction member at a first velocity and the second traction member at a second velocity different than the first velocity.

In another aspect, a control processor is configured to be in communication with the vehicle and the drive assembly and to control the drive assembly to change at least one of the first velocity or the second velocity in response to the vehicle turning in a direction.

In another aspect, the control processor is configured to be in communication with an actuator positioned within a cab of the vehicle, the actuator is separate from a steering wheel of the vehicle, and the actuator is operable to manually change at least one of the first velocity and the second velocity.

In another aspect, the control processor is configured to be in communication with a sensor configured to determine a direction of travel of the agricultural implement, and the control processor is configured to control the drive assembly to change at least one of the first velocity and the second velocity based on the direction of travel of the agricultural implement and a direction of travel of the vehicle.

In another aspect, the drive assembly includes a hydraulic motor.

In another aspect, an implement is configured to be moved over a supporting surface by a vehicle. The implement includes a frame and an implement assembly coupled to the frame and is configured to interact with the supporting surface. A first propulsion assembly is coupled to the frame at a first position with the first propulsion assembly having a first traction member configured to engage the supporting surface. A second propulsion assembly is coupled to the frame at a second position with the second propulsion assembly having a second traction member configured to engage the supporting surface. The first traction member is configured to be driven independently of the second traction member.

In another aspect, a drive assembly is operably coupled to the first and second propulsion assemblies and configured to drive the first traction member at a first velocity and the second traction member at a second velocity different than the first velocity.

In another aspect, the drive assembly includes a plurality of hydraulic motors.

In another aspect, a control processor is configured to be in communication with the drive assembly and a sensor coupled to a steering wheel of the vehicle, and the control processor is configured to control the drive assembly to change at least one of the first velocity and the second velocity in response to a signal generated by the sensor.

In another aspect, the control processor is configured to be in communication with an actuator positioned within a cab of the vehicle, the actuator is separate from a steering wheel of the vehicle, and the actuator is operable to manually change at least one of the first velocity and the second velocity.

In another aspect, the control processor is configured to be in communication with a sensor configured to determine a direction of travel of the implement, and the control processor is configured to control the drive assembly to change at least one of the first velocity and the second velocity based on the direction of travel of the implement and a direction of travel of the vehicle.

In another aspect, the first and second traction members are continuous tracks.

In another aspect, the implement assembly is a planter assembly configured to dispense agricultural seeds along the surface.

In another aspect, a control system is configured to steer an agricultural implement moveable over a supporting surface by a vehicle. The control system includes a first sensor configured to be coupled to a steering wheel of the vehicle configured to determine an angular position of the steering wheel, a drive assembly configured to be coupled to a propulsion assembly of the agricultural implement, and a control processor configured to be in communication with the first sensor and the drive assembly. The control processor is configured to receive a steering input from the first sensor, and send a steering output to the drive assembly based on the steering input to control a drive torque to the propulsion assembly.

In another aspect, an actuator is configured to be positioned within a cab of the vehicle separate from the steering wheel and the control processor is configured to be in communication with the actuator and operable to manually control the drive torque of the propulsion assembly.

In another aspect, the control processor is configured to be in communication with a second sensor configured to determine a direction of travel of the agricultural implement, and the control processor is configured to control the drive assembly based on the direction of travel of the agricultural implement and a direction of travel of the vehicle.

In another aspect, the drive assembly includes a hydraulic motor.

In another aspect, a manifold is configured to be positioned between the hydraulic motor and a power generator of the vehicle, and the control processor is coupled to the hydraulic motor to control the drive torque of the propulsion assembly.

In another aspect, a manifold is configured to be positioned between the hydraulic motor and a power generator of the vehicle, and the control processor is coupled to the manifold to control the drive torque of the propulsion assembly.

Any of the above referenced aspects of the disclosure can be combined with any one or more of the above referenced aspects of the disclosure.

In addition, other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of supporting other embodiments and being practiced or being carried out in various ways. Also, it is to be understood that the phraseology and terminology used herein is for the purpose of description and should not be regarded as limiting. Terms of degree, such as "substantially," "about," "approximately," etc., are understood by those of ordinary skill to refer to reasonable ranges outside of the given value, for example, general tolerances associated with manufacturing, assembly, and use of the described embodiments.

Figure 1:
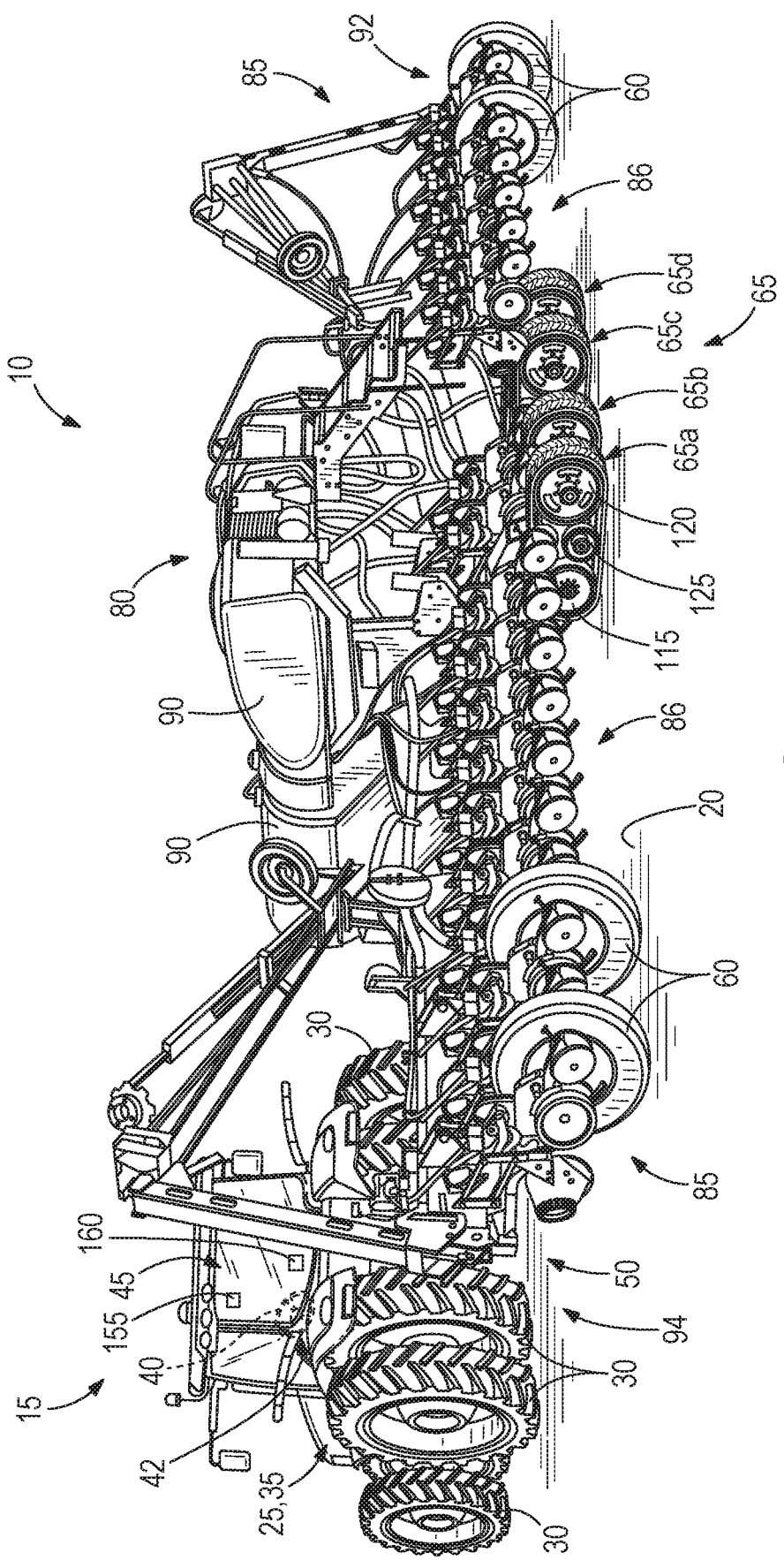
FIG. 1 is a perspective view of a vehicle coupled to an agricultural planter.

FIG. 1 illustrates an implement (e.g., an agricultural planter 10) coupled to a vehicle 15 to permit the vehicle 15 to pull the planter 10 along a supporting surface 20 (e.g., an agricultural field). In other embodiments, the implement can be a tillage implement, a sprayer implement, another agricultural implement that is pushed or pulled by the vehicle 15 across the surface 20, or the implement can be a non-agricultural implement (e.g., for use in construction, forestry, etc. applications).

Figure 5:
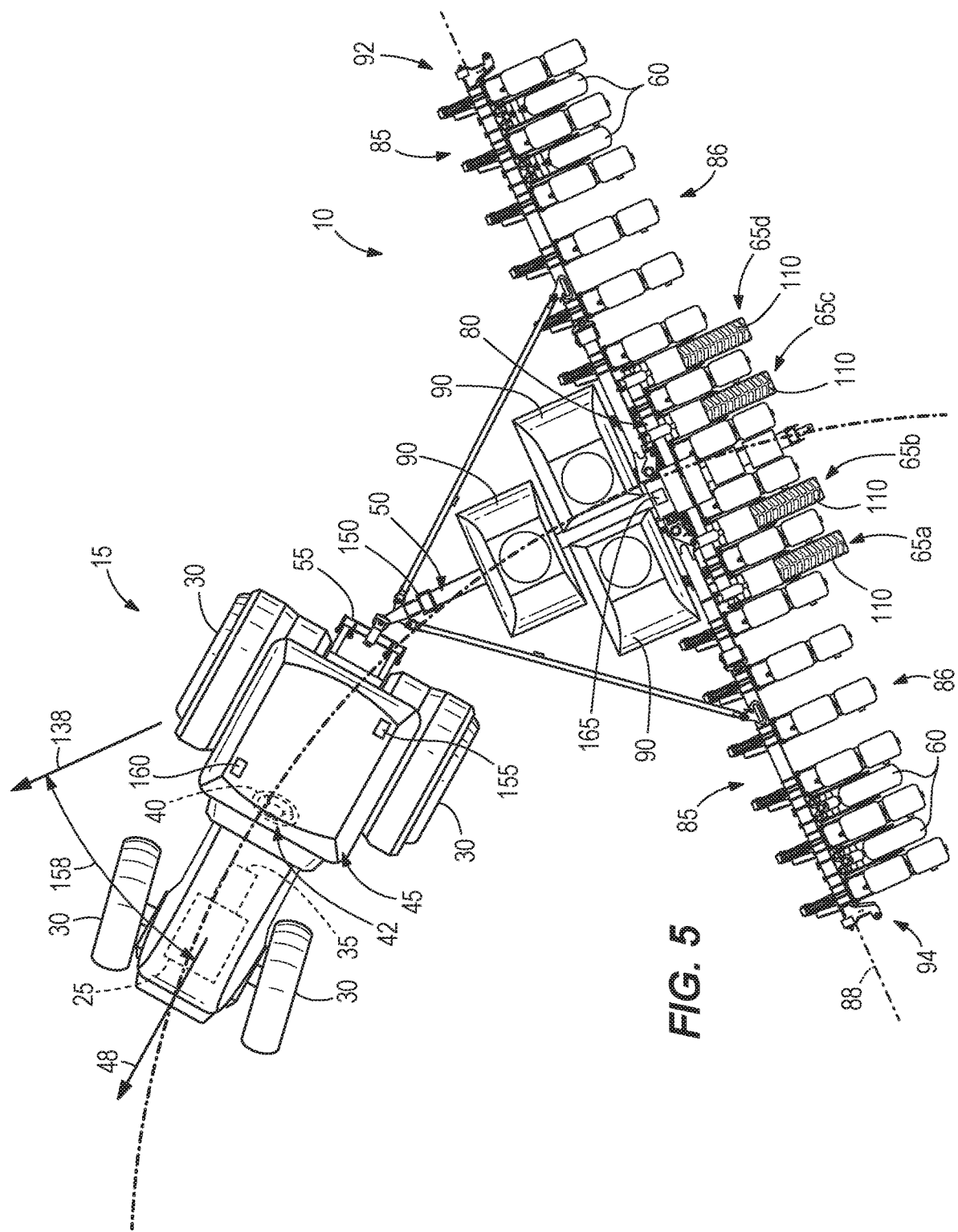
FIG. 5 is a top view of the vehicle and the agricultural planter of FIG. 1 turning in a direction.

The vehicle 15 includes a prime mover 25 operable to drive certain wheels 30 of the vehicle 15 to move the vehicle 15 and the planter 10 along or across the surface 20. The prime mover 25 is also operable to drive a power generator 35 that supplies the vehicle 15 and the planter 10 with hydraulic power and/or electrical power. As such, the power generator 35 can be a hydraulic pump and/or an electric generator. In addition, the vehicle 15 includes a steering wheel 40 within an operator's cab 45 operable to steer the vehicle 15 in a direction of travel 48 (FIG. 5). A sensor 42 is coupled to the steering wheel 40 and is configured to measure an amount the steering wheel 40 is rotated as the vehicle 15 is being steered.

With further reference to FIGS. 1 and 5, the illustrated planter 10 includes a frame 50 selectively coupled to a hitch 55 of the vehicle 15, with the frame 50 supported above the surface 20 by wheels 60 and propulsion assemblies 65, to be further discussed in more detail. The frame 50 includes a central portion 80 and two wing or outboard portions 85 positioned on opposite sides of the central portion 80. The central and outboard portions 80, 85 in combination support planter assemblies 86 positioned along a longitudinal axis 88 defined by a portion of the frame 50. The central portion 80 also supports holding tanks 90 that hold planting matter (e.g., seeds) and are in communication with each planter assembly 86 to supply the planter assemblies 86 with the seeds.

The wheels 60 are rotatably coupled to the outboard portions 85 and are freely rotatable (e.g., non-drivable wheels). The wheels 60 are positioned near ends 92, 94 of the outboard portions 85 as illustrated to support the ends 92, 94 above the surface 20. In other embodiments, one or more wheels 60 can be coupled to the central portion 80 to at least partially support the central portion 80 above the surface 20.

With continued reference to FIG. 1, the propulsion assemblies 65 include four propulsion assemblies 65a, 65b, 65c, 65d, each coupled to a different location on the central portion 80 of the frame 50 to support the central portion 80 above the surface 20. In other embodiments, the planter 10 can have fewer than four (e.g., two) propulsion assemblies 65 coupled to the central portion 80. In further embodiments, the planter 10 can have propulsion assemblies 65 (e.g., two) coupled to the outboard portions 85. For example, a first propulsion assembly 65 can be coupled to one of the outboard portions 85 (e.g., adjacent the end 92 of the first outboard portion 85) and a second propulsion assembly 65 can be coupled to the other outboard portion 85 (e.g., adjacent the other end 94 of the second outboard portion 85). In further embodiments, the planter 10 can have more than four propulsion assemblies 65 total in various configurations supporting portions of the frame 50. All propulsion control of the planter 10 described herein is applicable regardless of number or location of the propulsion assemblies 65.

All of the propulsion assemblies 65 include similar components, and therefore, only one of the propulsion assemblies 65 will be discussed in detail herein, though the following description is equally applicable to the other propulsion assemblies 65.

Figure 2:
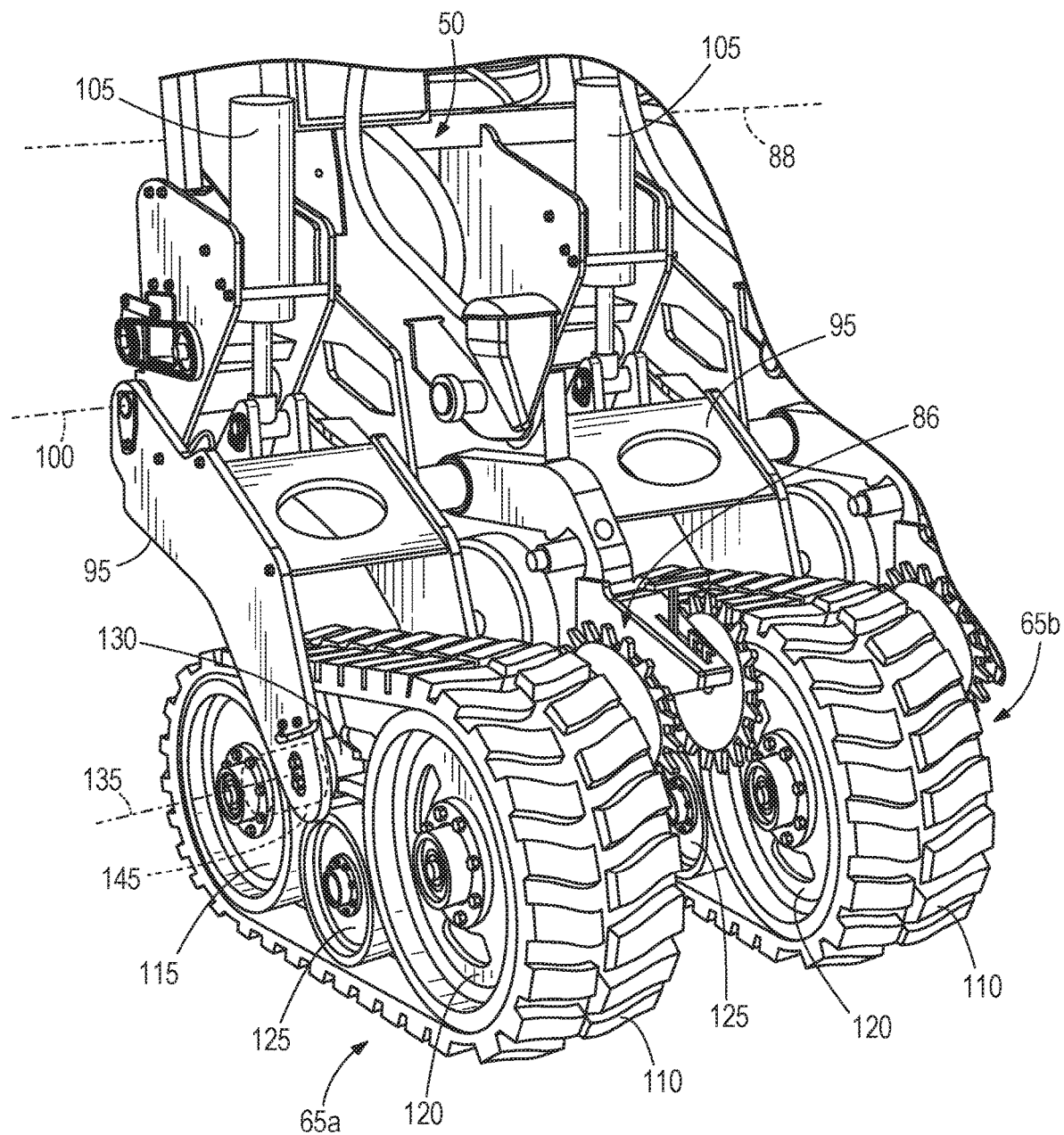
FIG. 2 is a detailed view of propulsion assemblies of the agricultural planter configured to assist the vehicle in steering the agricultural planter.

With reference to FIG. 2, the propulsion assembly 65a includes a bracket 95 pivotably coupled to the frame 50 about a first axis 100, which is substantially parallel to the longitudinal axis 88. An actuator, such as a hydraulic actuator (e.g., hydraulic actuator 105), is coupled to the frame 50 and the bracket 95 and operable to move the bracket 95 relative to the frame 50 about the first axis 100 to assist in raising or lowering the frame 50 relative to the surface 20.

The propulsion assembly 65a also includes a traction member (e.g., a continuous or endless member or track 110) that engages the surface 20 and is supported for rotational movement relative to the bracket 95 by a drive wheel 115 and an idler wheel 120. In other embodiments, both wheels 115, 120 can be drive wheels, or the wheels 120 can be the drive wheels and the wheels 115 idler wheels. As best shown in FIG. 2, another idler wheel 125 is positioned between the two wheels 115, 120 and is operable to bias a bottom portion of the track 110 toward the surface 20. The track 110 and the wheels 115, 120, 125 are coupled to a support 130, which is pivotably coupled to the bracket 95 about a second axis 135 substantially parallel to the longitudinal axis 88 of the frame 50. The illustrated propulsion assembly 65a is constrained from lateral movement, e.g., movement parallel to the longitudinal axis 88. Stated another way, rotational movement of the track 110 is parallel to a propulsion direction 138 of the planter 10, which is substantially transverse to the longitudinal axis 88. In other embodiments, the propulsion assembly 65a can, in contrast, selectively pivot in a direction parallel to the longitudinal axis 88. In further embodiments, the track 110 and the wheels 115, 120, 125 can be replaced with a single wheel driven about an axis (e.g., the second axis 135).

Figure 3:
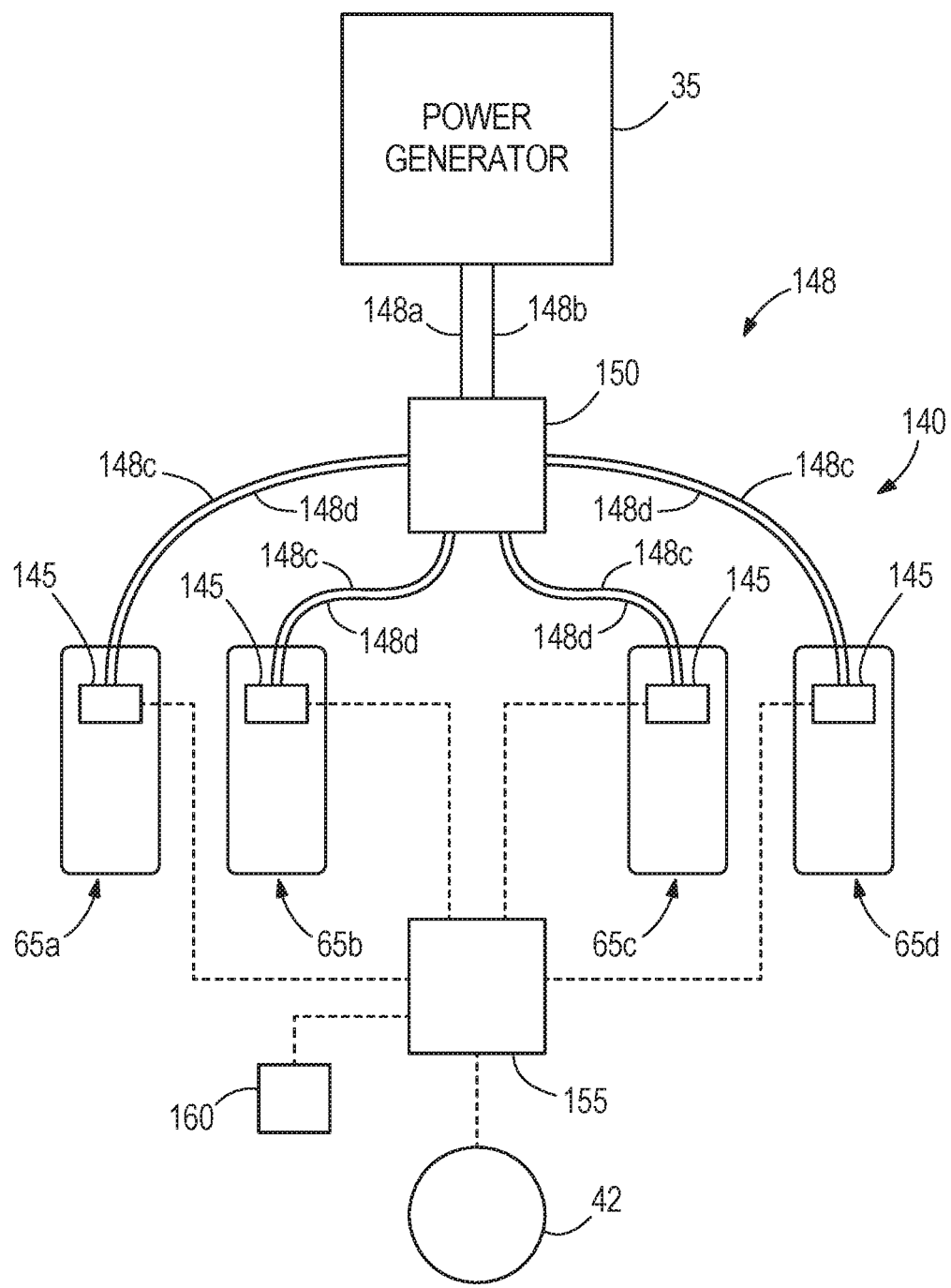
FIG. 3 illustrates a drive assembly according to one embodiment of the disclosure operable to control the propulsion assemblies of FIG. 2.

With reference to FIG. 3, a drive assembly 140 is operable to drive the propulsion assemblies 65 independently of each other. In particular, the drive assembly 140 includes a plurality of drive motors 145 (e.g., hydraulic motors, also shown in FIG. 2), with each hydraulic motor 145 coupled to one drive wheel 115 of a propulsion assembly 65a, 65b, 65c, 65d. As such, each hydraulic motor 145 is supported by the support 130 of one of the propulsion assemblies 65. The hydraulic motors 145 are also fluidly coupled (via hydraulic lines 148) to the power generator 35 such that the power generator 35 is operable to supply the hydraulic motors 145 with hydraulic pressure for the application of torque to the drive wheels 115. A manifold 150 is positioned fluidly between the hydraulic motors 145 and the power generator 35 such that only two hydraulic lines (e.g., one supply line 148a and one return line 148b) couple the manifold 150 to the power generator 35, and two hydraulic lines (e.g., one supply line 148c and one return line 148d) couple each hydraulic motor 145 to the manifold 150.

In addition, a control processor 155 is in communication with the hydraulic motors 145 and operable to control each individual hydraulic motor 145 to ultimately control torque provided to the tracks 110 by the corresponding drive wheels 115. The illustrated control processor 155 is also in communication with the steering wheel 40 of the vehicle 15 (FIG. 3, also FIG. 1). In the illustrated embodiment, the control processor 155 is within the vehicle 15. In other embodiments, the control processor 155 can be within or coupled to a portion of the planter 10.

Figure 4:
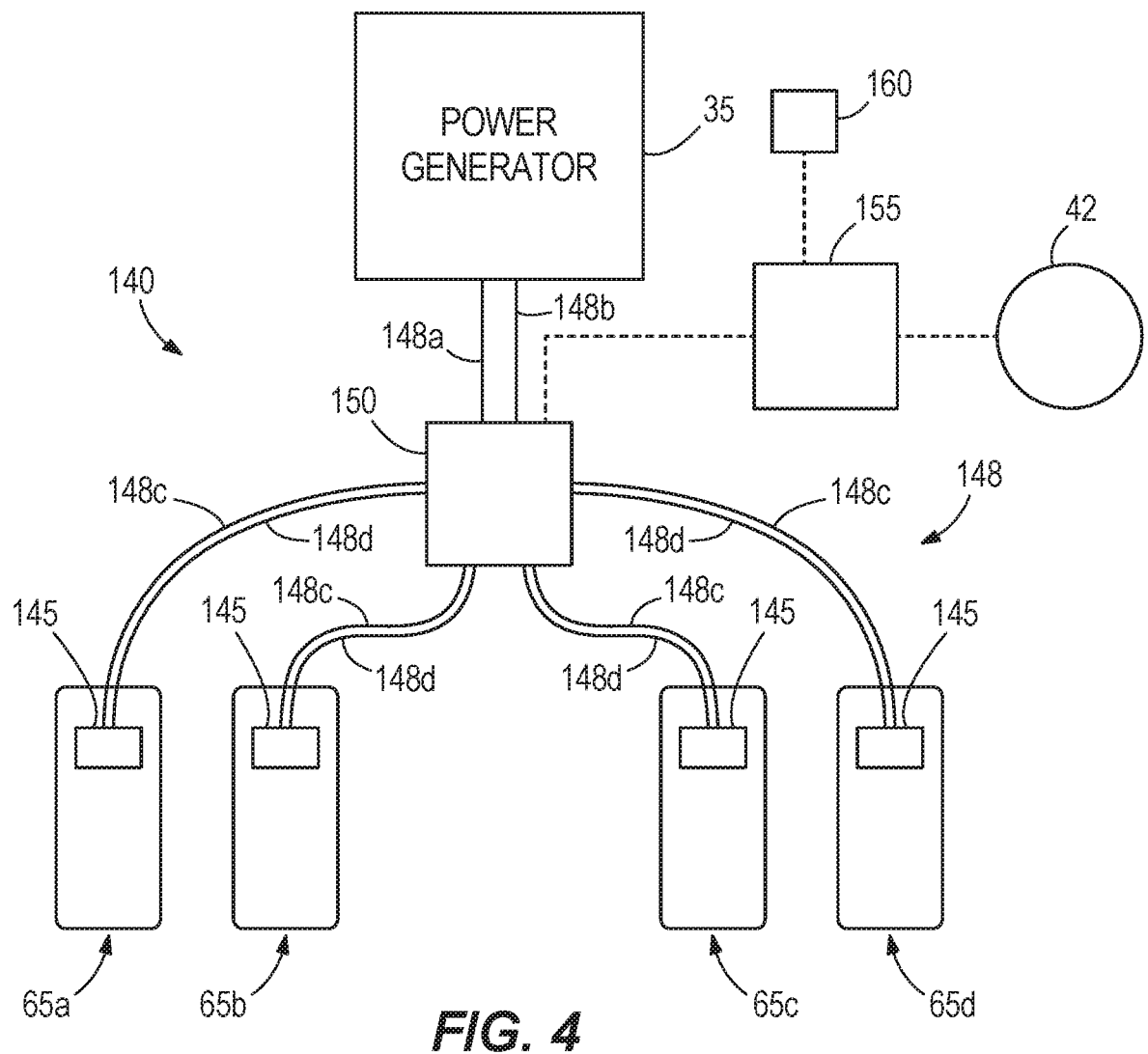
FIG. 4 illustrates a drive assembly according to another embodiment of the disclosure operable to control the propulsion assemblies of FIG. 2.

Referring to FIG. 4, in further embodiments, the control processor 155 can be in communication with the manifold 150 rather than with each hydraulic motor 145. As such, the control processor 155 is operable to control each hydraulic motor 145 via the manifold 150, i.e., by controlling the manifold 150 to allow for the desired hydraulic pressure to each hydraulic motor 145.

In yet further embodiments, the drive motors 145 of the drive assembly 140 can be electric motors in communication with the control processor 155 and electrically coupled to the power generator 35 (e.g., the electric generator) of the vehicle 15. As such, the control processor 155 is operable to control each electric motor individually to provide the desired torque to each drive wheel 115 to move each track 110 at a desired speed.

Maneuvering conventional planters about turns (e.g., sharp turns) on the support surface 20 is difficult due to the width along the longitudinal axis 88. The illustrated propulsion assemblies 65 assist the vehicle 15 in steering the planter 10 about a desired turn by ultimately controlling an angle 158 between the direction of travel of the vehicle 15 and the propulsion direction 138 of the planter 10.

With reference to FIG. 5, operation the vehicle 15 and the planter 10 are illustrated midway in making a turn (e.g., a 90-degree left hand turn) on the surface 20. Accordingly, to make the 90-degree left hand turn, an operator rotates the steering wheel 40 of the vehicle 15 counterclockwise. In response to this rotation, the control processor 155 receives a steering input from the sensor 42 for generating a steering output to the propulsion assemblies 65. Specifically, the control processor 155 receives the steering input from the sensor 42 representative of an angular amount the steering wheel 40 is rotated. For example, when the vehicle 15 is tracking straight, the steering wheel 40 is positioned at a 0-degree angle (e.g., 0% rotated) and the sensor 42 generates a signal representative of this position of the steering wheel 40. If the vehicle 40 is steered to the left, the sensor 42 measures the amount the steering wheel 40 is rotated to the left. If the vehicle 40 is steered to the right, the sensor 42 measures the amount the steering wheel 40 is rotated to the right.

The control processor 155 receives the aforementioned steering input from the sensor 42 to then generate the steering output to the propulsion assemblies 65. In particular, the control processor 155 controls each individual propulsion assembly 65 at a different speed to assist the vehicle 15 to steer the planter 10 through the turn as shown in FIG. 5. Specifically, the control processor 155 controls the speed of the track 110 of the first propulsion assembly 65a (inner most propulsion assembly 65 relative to the turning radius of the vehicle 15 and the planter 10) at a first velocity. The control processor 155 controls the speed of the track 110 of the second propulsion assembly 65b at a second velocity greater than the first velocity. The control processor 155 controls the speed of the track 110 of the third propulsion assembly 65c at a third velocity greater than the second velocity. And the control processor 155 controls the speed of the track 110 of the fourth propulsion assembly 65d at a fourth velocity greater than the third velocity, such that the propulsion assemblies 65a, 65b, 65c, and 65d work in concert to accomplish the desired turn based on the steering input of the wheel 40.

In other embodiments, some of the propulsion assemblies 65 can be driven at the same velocity during a turn. For example, the first and second propulsion assemblies 65a, 65b can be driven at a first velocity and the third and fourth propulsion assemblies 65c, 65d can be driven at a second velocity different than the first velocity.

The propulsion assemblies 65 can be driven to assist in movement of the planter 10 along or across the surface 20 even when the vehicle 15 and planter 10 are tracking straight. Alternatively, at least some of the propulsion assemblies 65 can freely rotate (i.e., are non-driven) during movement of the planter 10. For example, certain propulsion assemblies 65 can freely rotate when the vehicle 15 and planter 10 are tracking straight and then engage once the operator of the vehicle 15 begins to move the steering wheel 40.

In further embodiments, the propulsion assemblies 65 can be manually operated using an actuator 160 (e.g., a joystick) positioned within the cab 45 of the vehicle 15 (FIG. 5, also FIG. 1). Movement of the actuator 160 is received by the control processor 155 to control at least the first propulsion assembly 65a and the fourth propulsion assembly 65d. As such, the operator of the vehicle 15 can anticipate a turning operation of the vehicle 15 and the planter 10 and position the planter 10 accordingly for the turning operation. For example, before the vehicle 15 begins to turn as shown in FIG. 5, the operator of the vehicle 15 can move the actuator 160 in a direction for the propulsion assemblies 65 to move the planter 10 opposite to the turning direction (e.g., to the right within FIG. 5) creating a wider turning radius for the planter 10. By anticipating the movement of the vehicle 15 (e.g., before rotation of the steering wheel 40) and positioning the planter 10 accordingly, the planter 10 is more easily maneuvered about a desired turn. Alternatively, the actuator 160 can be moved while the vehicle 15 is turning (e.g., as shown in FIG. 5) such that the propulsion assemblies 65 can further maneuver the planter 10 independently from the steering input from the steering wheel 40.

In yet further embodiments, the control processor 155 and/or the actuator 160 can move at least two different propulsion assemblies 65 in two different rotational directions (e.g., one propulsion assembly 65 in a forward direction and another propulsion assembly 65 in a rearward direction). For example, the first propulsion assembly 65a can be driven in a rearward direction and the fourth propulsion assembly 65d can be driven in a forward direction when the steering wheel 40 is rotated to turn the vehicle 15 in the direction as illustrated in FIG. 5. Alternatively, the actuator 160 can be moved while the vehicle 10 is tracking straight for one propulsion assembly 65 to be driven in a forward direction and another propulsion assembly 65 to be driven in a rearward direction.

Figure 6:
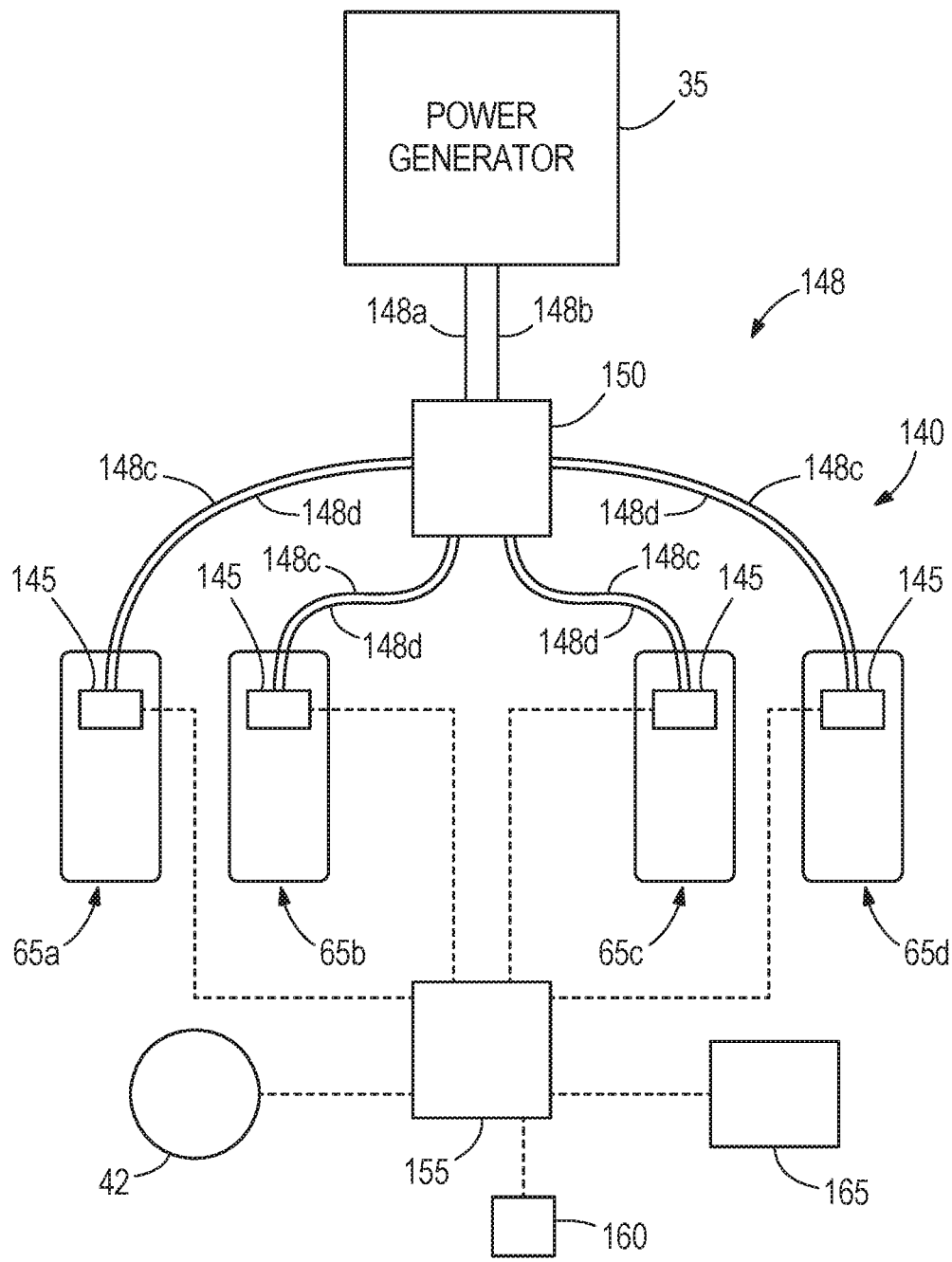
FIG. 6 illustrates a drive assembly according to yet another embodiment of the disclosure operable to control the propulsion assemblies of FIG. 2.
Figure 7:
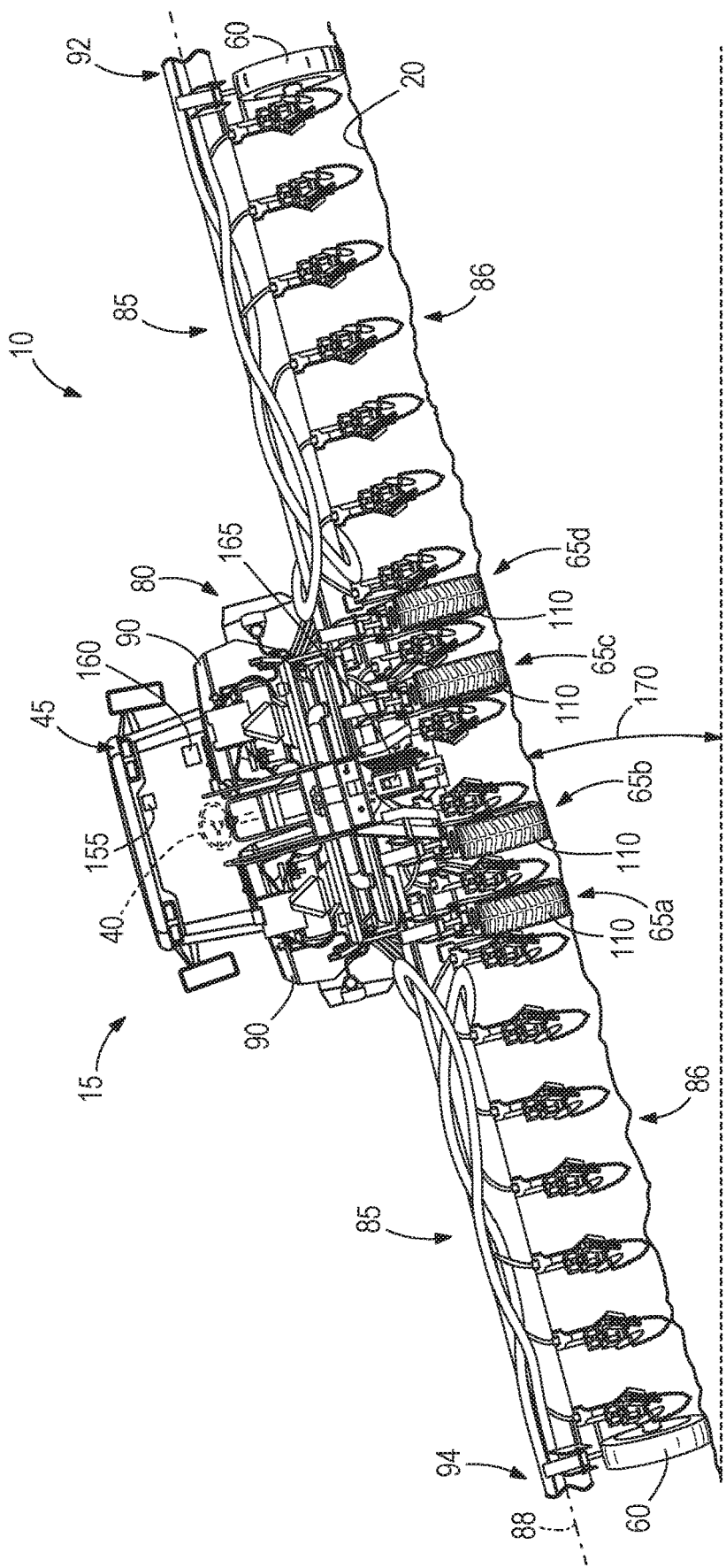
FIG. 7 is a rear view of the vehicle and the agricultural planter of FIG. 1 moving along an inclined surface.

With reference to FIGS. 6 and 7, the planter 10 also includes a transmitter or sensor 165 coupled to the frame 50 and operable to measure a grade angle 170 of the surface 20 supporting the vehicle 15 and the planter 10. The illustrated sensor 165 (e.g., a gyroscope) is in communication with the control processor 155. In other embodiments, the grade measuring device can be another type of sensor for measuring the grade angle 170. In further embodiments, the grade measuring device can be a global positioning system (e.g., GPS) of the vehicle 15 configured to determine the grade angle 170. In yet further embodiments, the transmitter 165 is operable to determine the propulsion direction 138 of the planter 10.

In operation, as the vehicle 15 and planter 10 track straight along a relatively flat surface (e.g., the grade angle 170 is about 0-degrees), the direction of travel 48 of the vehicle 15 is substantially parallel to the propulsion direction 138 of the planter 10 (i.e., the angle 158 is substantially zero). When the vehicle 15 and the planter 10 are on the surface 20 with a grade angle 170 (e.g., a 30-degree grade angle), however, and the surface 20 is in a certain condition (e.g., a soft, muddy condition), the weight of the planter 10 can cause the planter 10 to slide down the surface 20 as the vehicle 15 is tracking across the surface 20 such that the angle 158 becomes oblique (e.g., the angle 158 is greater than about 20 degrees). This oblique relationship can negatively affect the planting assemblies 86.

In such a situation, the illustrated control processor 155 receives a signal from the sensor 165 to generate a tracking output to the propulsion assemblies 65 for assisting the planter 10 in tracking straight with the vehicle 15. As such, the control processor 155 can control the propulsion assemblies 65 based on the signal of the sensor 165 independent from the steering input from the steering wheel 40. Referring to FIG. 7, the control processor 155 automatically controls the fourth propulsion assembly 65d (the uphill-most propulsion assembly) at a faster velocity than the other propulsion assemblies 65, i.e. at least assembly 65a, to help maintain the planter 10 tracking straight on the inclined surface 20. The velocities of the propulsion assemblies 65 are based on the input signal the control processor 155 receives from the sensor 165. For example, under a small grade angle 170 allowing the angle 158 to be relatively small, the differential between the velocities of the first and fourth propulsion assemblies 65a, 65d may be little to none. As the grade angle 170 increases, which could promote a larger angle 158, the differential between the velocities of the first and fourth propulsion assemblies 65a, 65d may increase to help keep the planter 10 tracking straight. Ultimately, the controller 155 monitors the angle 158 and controls the propulsion assemblies 65 accordingly to assist the planter 10 in tracking straight with the vehicle 10.

With reference to FIG. 6, the control processor 155 is in communication with the steering wheel 40 and the sensor 165 such that the control processor 155 can control the propulsion assemblies 65 as the planter 10 being steered in a direction (FIG. 5) while the planter 10 is concurrently moving along the inclined surface 20 (FIG. 7). In other words, any combination of inputs from the steering wheel 40, the actuator 160, and the sensor 165 received by the processor 155 are analyzed by the processor 155 to assist in steering control of the planter 10 relative to the vehicle 15 via independent and/or coordinated control of the propulsion assemblies 65. In further embodiments, the planter 10 can include another sensor in communication with the control processor 155 that measures a surface condition of the surface 20. As such, the control processor 155 can control the propulsion assemblies 65 based at least on the surface condition. For example, the sensor can determine a relatively hard surface condition of the surface 20, which will promote a relatively small angle 158 while the vehicle 15 is tracking straight across a surface having a relatively large grade angle 170, for the control processor 155 to control the propulsion assemblies 65 accordingly (e.g., at the small velocities). Alternatively, the sensor can determine a relatively soft surface condition of the surface 20, which will promote a larger angle 158 while the vehicle 15 is tracking straight across the same surface having the relatively large grade angle 170, for the control processor 155 to control the propulsion assemblies 65 accordingly (e.g., drive one propulsion assembly quicker than another propulsion assembly).

Although the disclosure has been described in detail with reference to certain preferred embodiments, variations and modifications exist within the scope and spirit of one or more independent aspects of the disclosure as described. Various features and advantages of the disclosure are set forth in the following claims.

What is claimed is:

1. An agricultural planter configured to be moved over a supporting surface by a vehicle, the agricultural planter comprising:
   a frame;
   a planter assembly coupled to the frame;
   a first propulsion assembly coupled to the frame at a first position, the first propulsion assembly including a first traction member configured to engage the supporting surface;
   a second propulsion assembly coupled to the frame at a second position, the second propulsion assembly including a second traction member configured to engage the supporting surface; and
   a drive assembly operably coupled to both the first and second propulsion assemblies, wherein the drive assembly is configured to drive the first traction member at a first velocity, and wherein the drive assembly is configured to drive the second traction member at a second velocity different than the first velocity, and
   further comprising a control processor configured to be in communication with the vehicle, the drive assembly, and an actuator positioned within a cab of the vehicle, wherein the actuator is separate from a steering wheel of the vehicle, and wherein the actuator is operable to manually change at least one of the first velocity and the second velocity.

2. The agricultural planter of claim 1, wherein the control processor is configured to be in communication with a sensor configured to determine a direction of travel of the agricultural planter, and wherein the control processor is configured to control the drive assembly to change at least one of the first velocity and the second velocity based on the direction of travel of the agricultural planter and a direction of travel of the vehicle.

3. The agricultural planter of claim 1, wherein the drive assembly includes a hydraulic motor.

4. An implement configured to be moved over a supporting surface by a vehicle, the implement comprising:
   a frame;
   an implement assembly coupled to the frame, the implement assembly configured to interact with the supporting surface;
   a first propulsion assembly coupled to the frame at a first position, the first propulsion assembly including a first traction member configured to engage the supporting surface; and
   a second propulsion assembly coupled to the frame at a second position, the second propulsion assembly including a second traction member configured to engage the supporting surface, wherein the first traction member is configured to be driven independently of the second traction member,
   further comprising a drive assembly operably coupled to the first and second propulsion assemblies, wherein the drive assembly is configured to drive the first traction member at a first velocity, and wherein the drive assembly is configured to drive the second traction member at a second velocity different than the first velocity,
   further comprising a control processor configured to be in communication with the drive assembly and a sensor coupled to a steering wheel of the vehicle, wherein the control processor is configured to control the drive assembly to change at least one of the first velocity and the second velocity in response to a signal generated by the sensor, and
   wherein the control processor is configured to be in communication with an actuator positioned within a cab of the vehicle, wherein the actuator is separate from a steering wheel of the vehicle, and wherein the actuator is operable to manually change at least one of the first velocity and the second velocity.

5. The implement of claim 4, wherein the drive assembly includes a plurality of hydraulic motors.

6. The implement of claim 4, wherein the control processor is configured to be in communication with a sensor configured to determine a direction of travel of the implement, and wherein the control processor is configured to control the drive assembly to change at least one of the first velocity and the second velocity based on the direction of travel of the implement and a direction of travel of the vehicle.

7. The implement of claim 4, wherein the first and second traction members are continuous tracks.

8. The implement of claim 4, wherein the implement assembly is a planter assembly configured to dispense agricultural seeds along the surface.

9. A control system configured to steer an agricultural implement moveable over a supporting surface by a vehicle, the control system comprising:
   a first sensor configured to be coupled to a steering wheel of the vehicle, the first sensor configured to determine an angular position of the steering wheel;
   a drive assembly configured to be coupled to a propulsion assembly of the agricultural implement, wherein the drive assembly is configured to drive a first traction member at a first velocity, and wherein the drive assembly is configured to drive a second traction member at a second velocity different than the first velocity; and
   a control processor configured to be in communication with the first sensor and the drive assembly, the control processor configured to
      receive a steering input from the first sensor, and
      send a steering output to the drive assembly based on the steering input to control a drive torque to the propulsion assembly, and
   further comprising an actuator configured to be positioned within a cab of the vehicle separate from the steering wheel, wherein the control processor is configured to be in communication with the actuator and operable to manually control the drive torque of the propulsion assembly.

10. The control system of claim 9, wherein the control processor is configured to be in communication with a second sensor configured to determine a direction of travel of the agricultural implement, and wherein the control processor is configured to control the drive assembly based on the direction of travel of the agricultural implement and a direction of travel of the vehicle.

11. The control system of claim 9, wherein the drive assembly includes a hydraulic motor.

12. The control system of claim 11, further comprising a manifold configured to be positioned between the hydraulic motor and a power generator of the vehicle, wherein the control processor is coupled to the hydraulic motor to control the drive torque of the propulsion assembly.

13. The control system of claim 11, further comprising a manifold configured to be positioned between the hydraulic motor and a power generator of the vehicle, wherein the control processor is coupled to the manifold to control the drive torque of the propulsion assembly.

* * * * *